(12) United States Patent
Pringle et al.

(10) Patent No.: US 7,476,432 B2
(45) Date of Patent: Jan. 13, 2009

(54) PHOSPHORESCENT PULTRUSION

(75) Inventors: Todd Pringle, West Fargo, ND (US); Aaron H. Johnson, Fargo, ND (US)

(73) Assignee: Tecton Products, Fargo, ND (US)

( * ) Notice: Subject to any disclaimer, the term of this patent is extended or adjusted under 35 U.S.C. 154(b) by 168 days.

(21) Appl. No.: 10/857,640

(22) Filed: May 28, 2004

(65) Prior Publication Data

US 2005/0266223 A1    Dec. 1, 2005

(51) Int. Cl.
*B32B 1/04* (2006.01)
*B32B 3/02* (2006.01)
*B32B 27/32* (2006.01)
*B32B 5/16* (2006.01)

(52) U.S. Cl. .................... 428/76; 428/68; 428/220; 428/323; 428/332; 428/333; 428/334; 428/335; 428/336; 252/301.16; 252/301.33; 252/301.36

(58) Field of Classification Search ............. None
See application file for complete search history.

(56) References Cited

U.S. PATENT DOCUMENTS

| | | | |
|---|---|---|---|
| 5,135,591 A | | 8/1992 | Vockel, Jr. et al. |
| 5,223,330 A | * | 6/1993 | Vockel et al. ............ 428/204 |
| 5,724,909 A | | 3/1998 | Pitman et al. |
| 5,904,017 A | | 5/1999 | Glatz et al. |
| 6,207,077 B1 | | 3/2001 | Burnell-Jones |
| 6,375,864 B1 | | 4/2002 | Phillips et al. |
| 6,599,444 B2 | | 7/2003 | Burnell-Jones |
| 6,676,276 B2 | | 1/2004 | Stephens |
| 2003/0085383 A1 | | 5/2003 | Burnell-Jones |

* cited by examiner

*Primary Examiner*—Sheeba Ahmed
(74) *Attorney, Agent, or Firm*—Schwegman, Lundberg & Woessner, P.A.

(57) ABSTRACT

A plastic component includes a fiber-reinforced pultruded profile having an outer surface and a phosphorescent coating located on at least a portion of the surface.

42 Claims, 8 Drawing Sheets

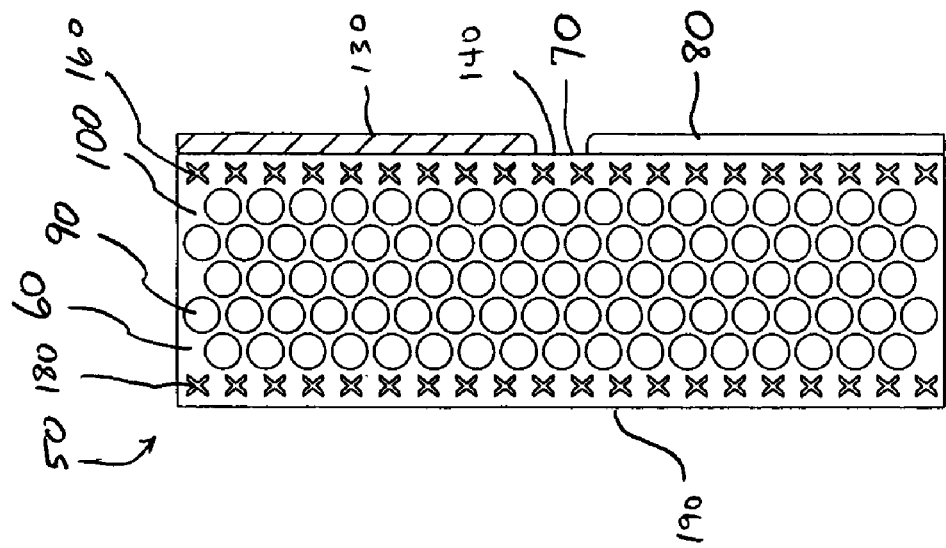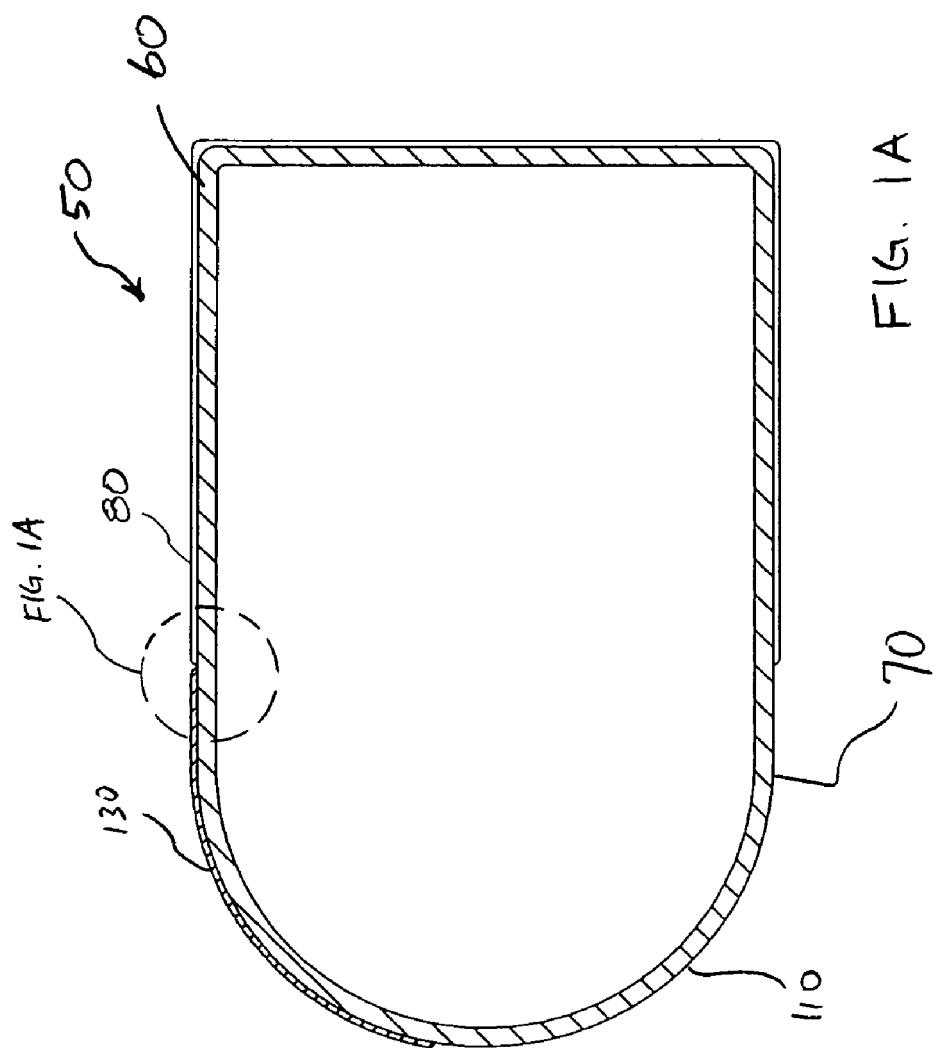

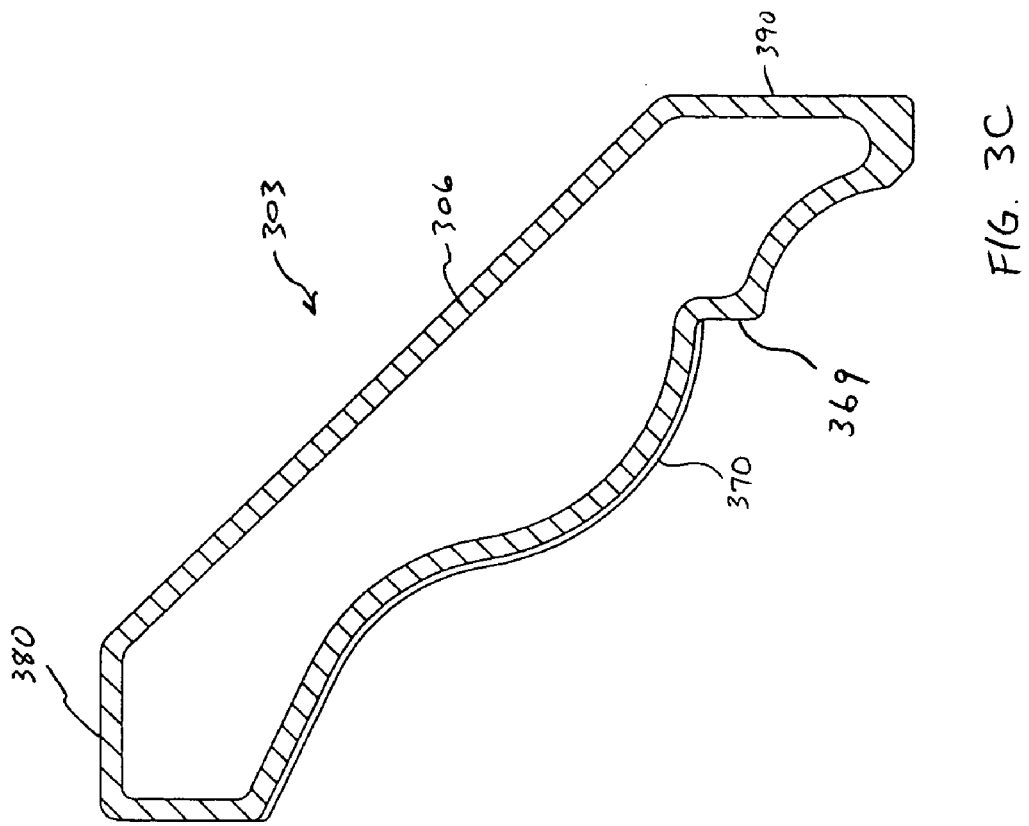
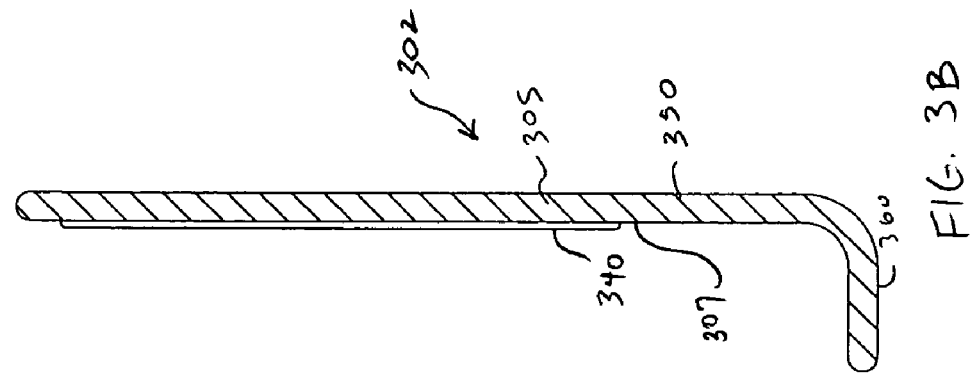
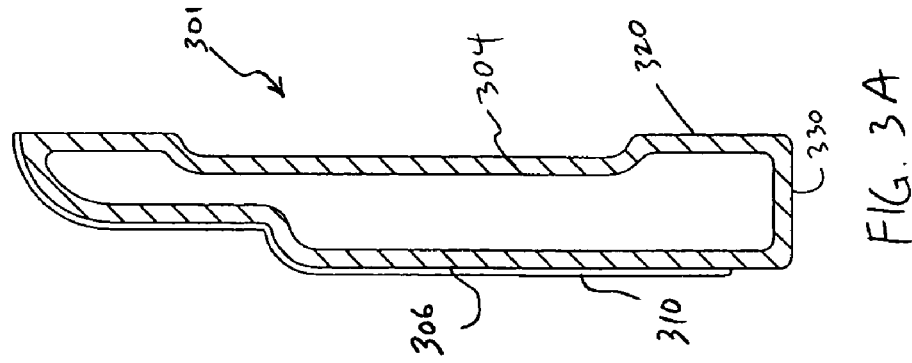

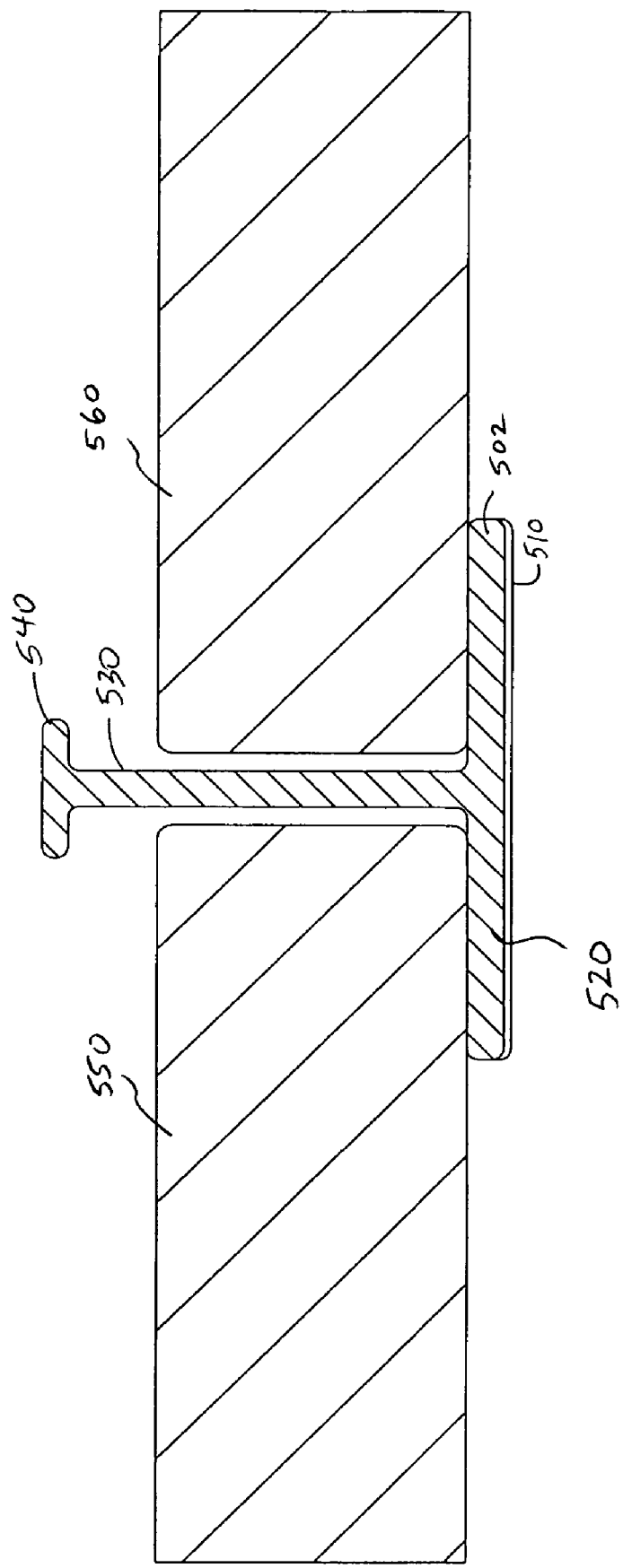

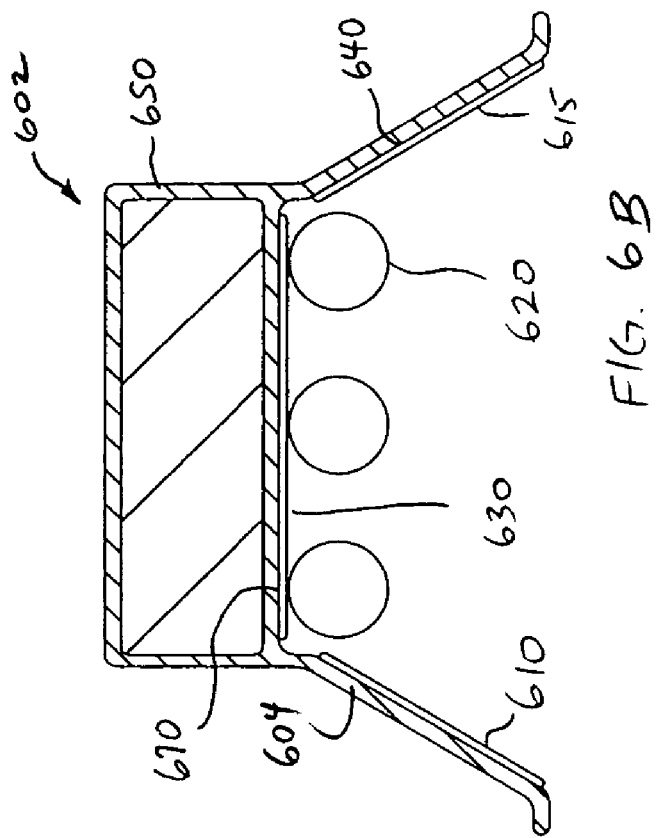
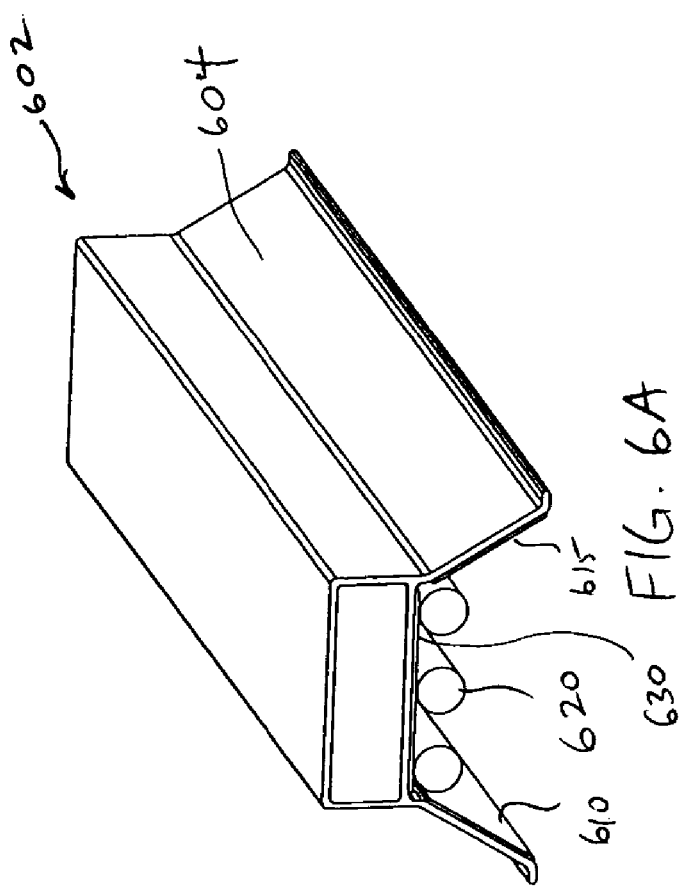

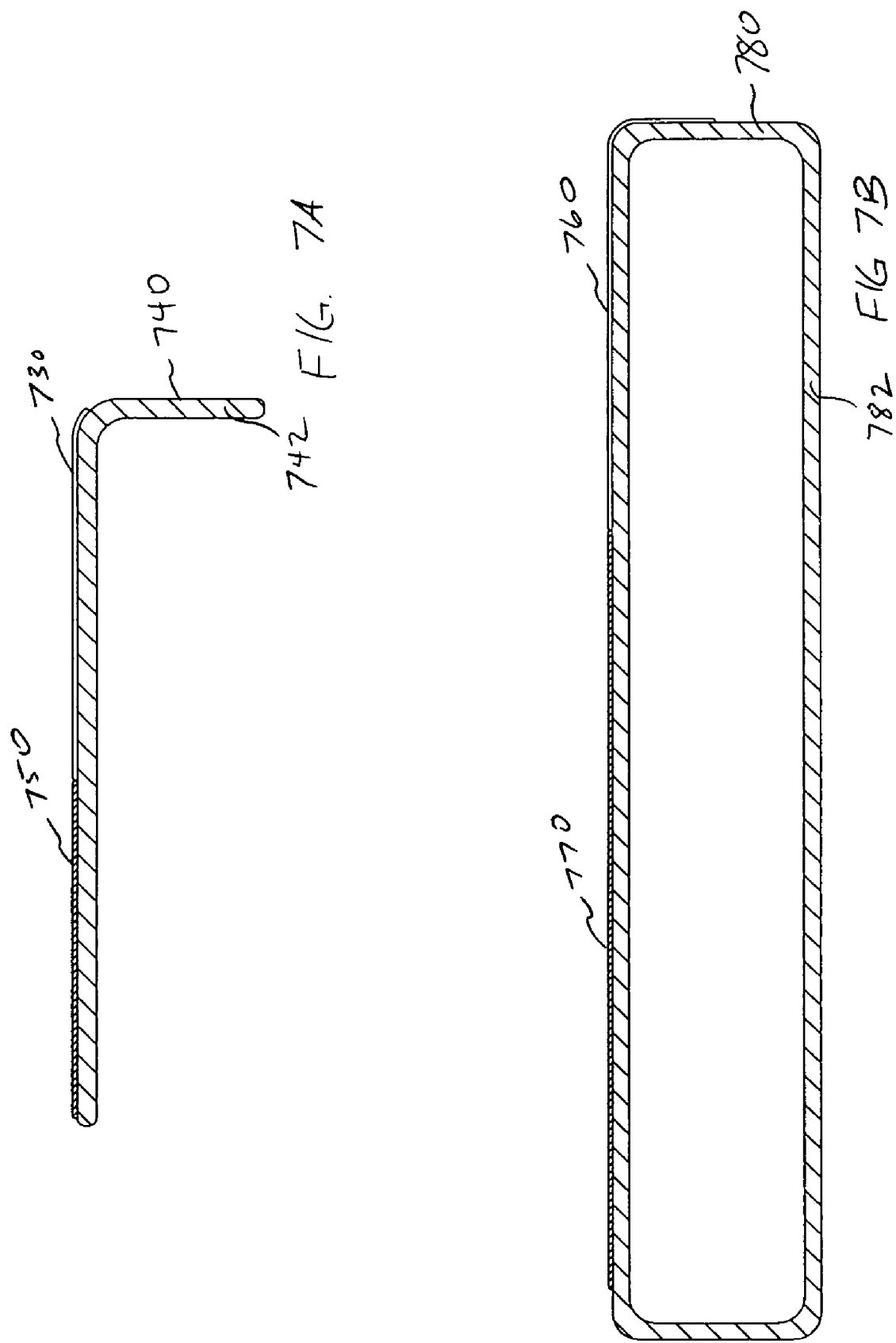

PHOSPHORESCENT PULTRUSION

FIELD

This application generally relates to plastic components and more specifically to pultruded products.

BACKGROUND

Pultrusion is an automated and continuous method of forming composite parts. Glass or other reinforcing fibers are impregnated with thermosetting resin and pulled through a forming guide and a heated die. The forming guide orients the fibers to be properly placed in the heated die to insure that the pultruded part is properly reinforced across its shape. The heated die cures and solidifies the resin around the reinforcing fibers, thus forming the composite part. The pultruded part, having a profile shape, is continuously pulled out of the heated die by a puller.

Pultrusion allows for composite parts to be produced with complex profile shapes, diverse resin mixtures, and numerous reinforcement types. These features make pultrusion a versatile process where shape and properties can be tailored to a specific application.

The surface appearance of a pultruded part depends on many factors. For smooth and decorative surfaces, low profile additives and surfacing veils are used to produce a smooth surface. Low profile additives are added to the mixture to counter resin shrinkage and reduce fiber imprint. Surfacing veils cover the reinforcing fibers with a cloth-like material that is typically made with nylon fibers, polyester fibers, or glass fibers. Surfacing veils can be pigmented or dyed to give color or patterns to the pultruded surface. However, because the veils are covered with a thin layer of cured resin, the color imparted on the pultrusion from the dyed veil is often hazed and lighter that the intended color. The hazing comes from a by-product of the shrinkage control mechanism of the low profile additive. If the low profile additive is removed, imparted colors are richer but fiber imprint is easily noticeable and overall dimensional shrinkage can be severe.

Moreover, this approach results in a minimally phosphorescent pultruded part because the haze from the resin layer on top of the surfacing veil scatters light and reduces the ability of the phosphorescent pigment to charge and to emit. In addition, the resin layer is also exposed to the UV needed for charging the phosphorescent pigments, resulting in yellowing and degradation. The surfacing veil also does not impart the necessary phosphorescent pigment surface concentration needed for effective glow-in-the-dark properties because a high concentration of pigment on the surfacing veil reduces the ability of the resin mixture to properly wet-out the veil.

Color can also be imparted onto a pultrusion surface by the addition of pigments to the mixture formulation. The mixture formulation contains resins, low profile additives, lubricants, fillers, and other special function additives. The hazing from the low profile additive also affects this imparted color from the mixture pigments. The hazing has the effect of lightening the color of the cured pultruded part. Cost-effective pultruded parts are also not UV stable enough for most outdoor applications. Long term exposure to UV can yellow and degrade the surface of the pultrusion. Because of these limitations, pultruded parts generally require protective coatings on them to give the necessary decorative finish and weather resistance.

Also, applying the pigment to the resin mixture requires far more pigment than is needed for critical surface concentration of phosphorescent pigment. Phosphorescent pigments can cost as much and one hundred times more per pound as the rest of the resin mixtures; therefore applying phosphorescent pigments in this manner is prohibitively expensive.

What is needed is glow-in-the-dark pultruded part and a method of making a glow-in-the-dark pultruded part that possesses sufficiently strong glow intensity, is UV stable, and is cost effective.

SUMMARY

In one aspect, a phosphorescent part includes a pultrusion with a phosphorescent coating. For example, in one embodiment the phosphorescent part can include a pultruded part with a thermoplastic resin containing phosphorescent pigments. In one embodiment, the phosphorescent pultrusion forms a handrail or guardrail. In one embodiment, the phosphorescent pultrusion forms base and/or crown moldings for safety illumination and emergency exiting. In one embodiment, the phosphorescent pultrusion forms the frames and/or panel of a door for safety illumination and emergency exiting. In one embodiment, the phosphorescent pultrusion forms ceiling time framing for safety illumination, emergency exiting, or decorative effects. In one embodiment, the phosphorescent pultrusion forms a light fixture and reflector for safety illumination. In one embodiment, the phosphorescent pultrusion forms a stair tread for safety illumination and/or emergency exiting.

BRIEF DESCRIPTION OF DRAWINGS

FIG. 1A shows a cross-section of glow-in-the-dark pultruded part in accordance with one embodiment.

FIG. 1B shows further details of the part of FIG. 1A.

FIG. 3A shows a cross-section of a glow-in-the-dark pultruded base molding in accordance with one embodiment.

FIG. 3B shows a cross-section of a glow-in-the-dark pultruded base molding in accordance with one embodiment.

FIG. 3C shows a cross-section of a glow-in-the-dark pultruded crown molding in accordance with one embodiment.

FIG. 5 shows a cross-section of a glow-in-the-dark pultruded ceiling tile frame in accordance with one embodiment.

FIG. 6A shows a perspective view of a glow-in-the-dark pultruded light fixture in accordance with one embodiment.

FIG. 6B shows a cross-section of the light fixture of FIG. 6A.

FIG. 7A shows a cross-section of a glow-in-the-dark pultruded stair tread in accordance with one embodiment.

FIG. 7B shows a cross-section of a glow-in-the-dark pultruded stair tread in accordance with one embodiment.

DETAILED DESCRIPTION

Figure 1C:
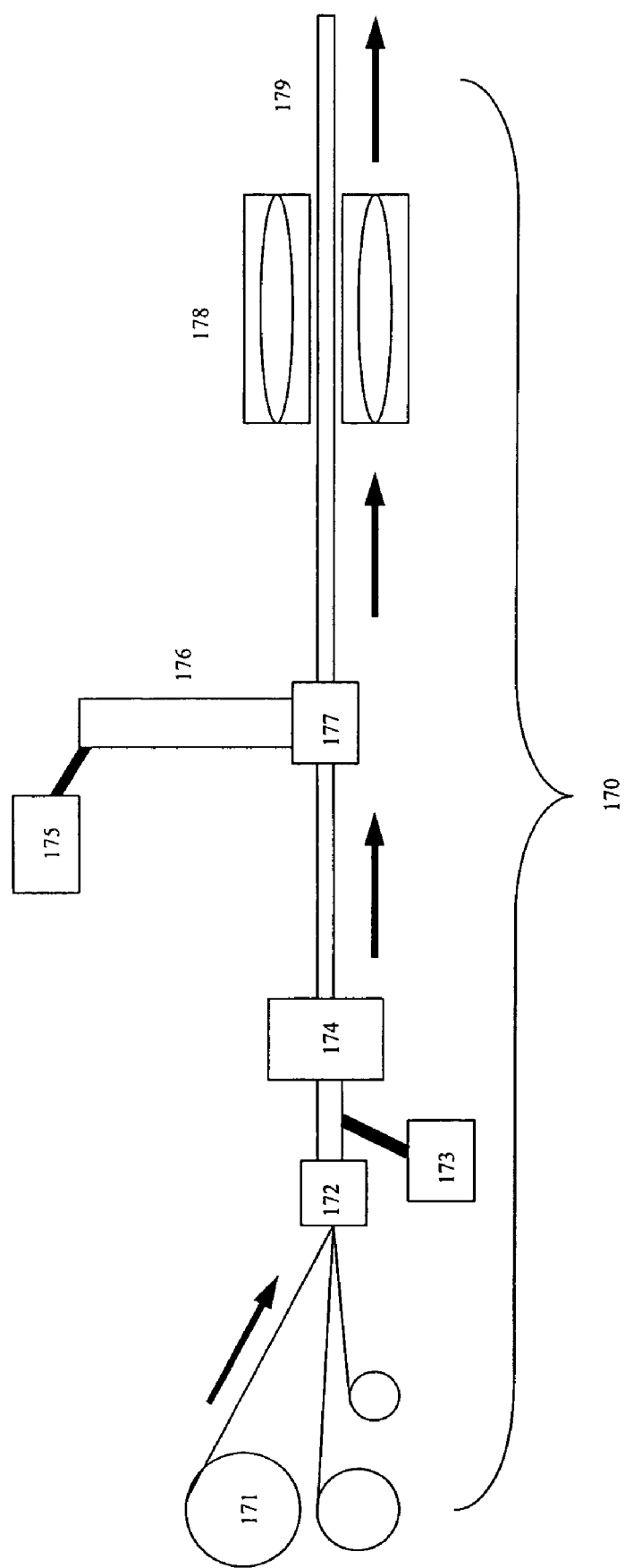
FIG. 1C shows a schematic representation of a system to form a pultruded part in accordance with one embodiment.

In the following detailed description, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that other embodiments may be utilized and that structural changes may be made without departing from the scope of the present invention. Therefore, the following detailed description is not to be taken in a limiting sense, and the scope of the present invention is defined by the appended claims and their equivalents.

FIGS. 1A and 1B illustrate a cross-section of a glow-in-the-dark pultruded part 50, in accordance with one embodiment. Pultruded part 50 is a plastic component and includes a fiber-reinforced pultruded profile 60 having an outer surface 70 and a phosphorescent coating 80 layered directly onto at least a portion of outer surface 70. The fiber-reinforced profile 60 includes reinforcing fibers 90. Reinforcing fibers 90 can include glass, carbon fiber, Kevlar, and other organic and inorganic filaments and fibers. The most common reinforcement used is glass fibers. Reinforcement fibers 90 can take the form of filament and strand bundles, called rovings. They also take the form of yarns, texturized yarns, chopped strand mats, continuous strand mats, knitted mats, woven mats, surfacing veils, and many hybrid combinations of rovings, yarns, mats, and veils.

A resin 100 used in the pultrusion can include thermosetting resins such as unsaturated polyesters in a styrene solution, or polyurethanes, phenolics, epoxides, thermosetting blends, and other thermosetting resins. Other resins used in the pultrusion can include thermoplastic resins based on polyurethanes, acrylics, polyethylenes, and other thermoplastic resins. In some examples, the resin can also be a thermoplastic resin that is embedded in rovings that melt and form the part inside the pultrusion die. Resin mixtures in the pultrusion can also contain organic, polymeric, and inorganic additives for such properties as shrink control, mold lubrication, colorants, fillers and other specialty additives.

Pultruded part 50 can take various dimensions and different detail features, according to various embodiments. In one embodiment, phosphorescent coating 80 is placed on the pultrusion surface where glow-in-the-dark properties are desired. The coverage of the phosphorescent coating could be a one-inch band or smaller for cost effective coverage, or it could encompass the entire outer surface of a pultruded part. In one example, coating 80 follows the contour of outer surface 70 and does not define a separate profile. In various examples, coating 80 can have a thickness of about 15 mils or less; a thickness of about 10 mils or less; and a thickness of about 5 mils or less.

Phosphorescent coating 80 could also follow the details and contours of a pultruded part. Additional decorative or functional coatings 130 can be placed on the same pultruded part, for example a UV protective coating. In some examples, pultruded part 50 includes one or more surfaces 110, 140, 190 without any coatings. Pultruded part 50 can include fiber reinforcements in the form of continuous, machine-direction fibers 90, as well as surface mats 160, 180, such as veils or fabrics.

Phosphorescent coating 80 includes a coating providing phosphorescence, or photoluminescence, which is a property of some materials used as pigments to impart glow-in-the-dark effects to other materials. Phosphorescent pigments can include zinc sulphides, stontium aluminate, or other materials. These minerals absorb UV and near UV light and re-emit that energy as visible light over time. Specific pigments are chosen for color, cost, intensity, charging time, stability in water, stability under UV, and other properties. In some example, as discussed below, glow-in-the-dark or phosphorescent parts are used for emergency and safety illumination or for decorative effects.

Pultruded parts, such as part 50 and the other pultrusions discussed below are economically feasible to manufacture and provide a high quality part since the expensive phosphorescent portion is only applied where it is needed and is not part of the pultruded resin mixture itself. Thus, the phosphorescent pigments are not blocked by a hazed layer of pultrusion resin as is the case when pigments are applied to surface veils. Moreover, in the present system, the phosphorescent pigments are concentrated only on the surface coating, where they are needed, and not wasted throughout the part by placing phosphorescent pigments into the thermosetting mixture of the composite. Moreover, applying the phosphorescent coating during the pultrusion process allows for continuous production as opposed to the batch processes as in gel-coating, for example.

FIG. 1C shows a schematic of a system 170 to produce a plastic component according to one embodiment. System 170 provides an automated and continuous method of forming composite parts. Glass or other reinforcing fibers 171 are impregnated with a non-phosphorescent, thermosetting resin 173 and pulled through a forming guide 172 and a heated die 174. The forming guide 172 orients the fibers 171 to be properly placed in the heated die 174 to insure that the pultruded part is evenly reinforced across its shape. The heated die 174 cures and solidifies the resin around the reinforcing fibers, thus forming the composite part 179. The pultruded part, having a profile shape, is continuously pulled out of the heated die by a puller 178.

The puller can be a clamp and stroke action from a reciprocating puller, or a smooth action from a caterpillar puller. In some embodiments, the pultrusion process can also employ thermoplastic resin as well. With thermoplastic resins the thermoplastic resin is heated to sufficiently wet-out the reinforcing fibers and the profile shape is formed by the heated die and set by controlled cooling. In one embodiment, phosphorescent coating 80 (FIG. 1A) is applied directly to the outer surface of the pultruded profile by a cross-head extruder 176. In this embodiment, the phosphorescent pigments are compounded with a thermoplastic resin which functions as the binder for the phosphorescent pigments. The thermoplastic resin with phosphorescent pigment 175 is fed into the cross-head extruder 176. The cross-head extruder melts and feeds the molten coating into an extrusion die 177 which applies the coating onto the outer surface of the pultruded part 179. This outer phosphorescent coating layer is applied directly to the pultruded part 179 in-line with a cross-head extruder 176 which continuously coats the pultruded part 179 with phosphorescent coating. In one embodiment, this coating includes an acrylic, which provides optical clarity in the visible and UV spectrum. Acrylic also imparts scratch resistance to the coating.

The thickness of the coating depends on the concentration of phosphorescent pigments needed to impart the desired glow-in-the-dark intensity, as well as the maximum amount of phosphorescent pigment concentration that the carrier resin can handle before manifesting defects on the surface. In one embodiment with acrylic as the carrier resin, the thickness is approximately 10 mils. In other examples, the thickness can be less than about 5 mils; less than about 10 mils; less than about 15 mils; and can range between about 1 mil to about 15 mils, or greater.

Figure 2:
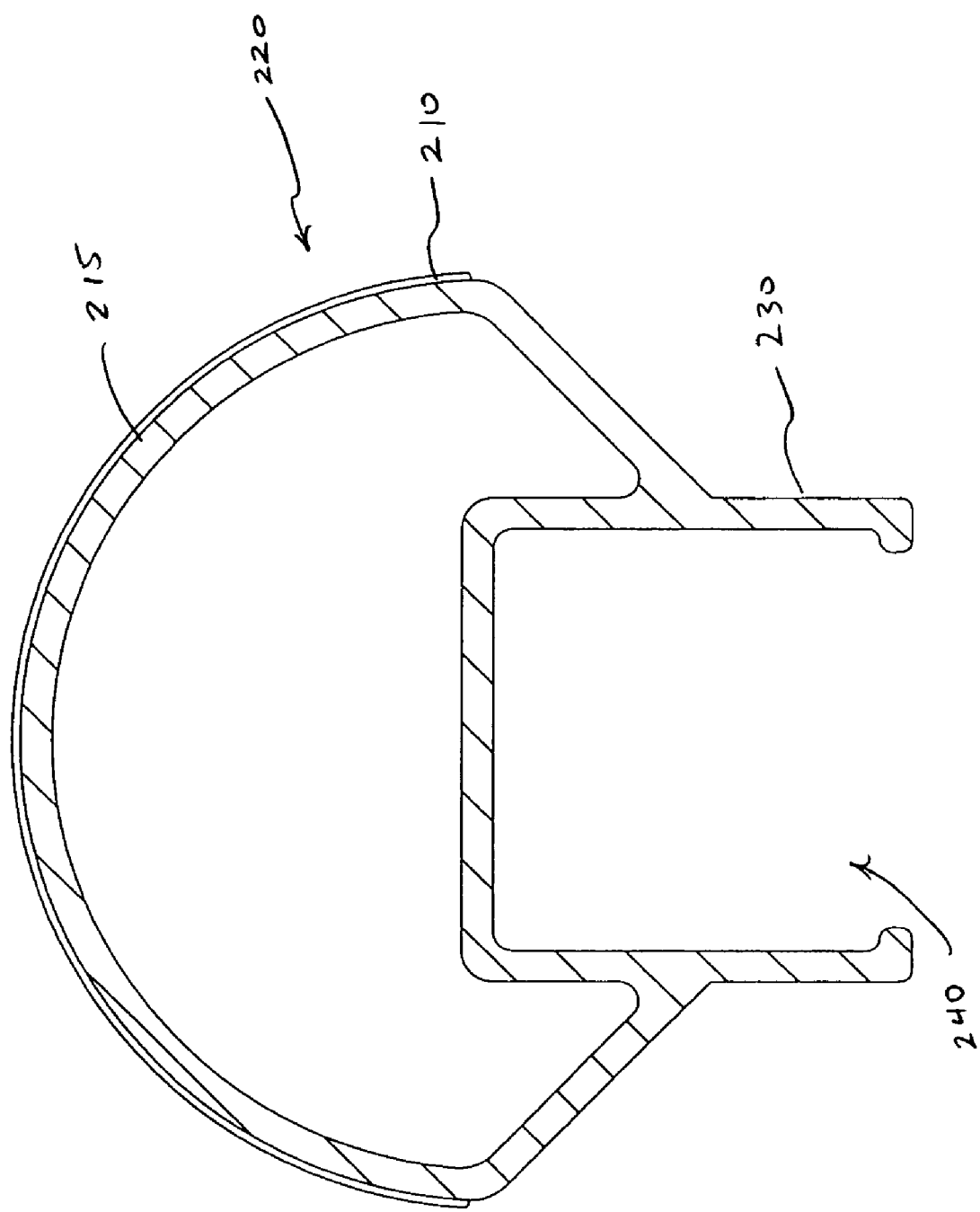
FIG. 2 shows a cross-section of a glow-in-the-dark pultruded handrail and/or guardrail in accordance with one embodiment.

FIG. 2 illustrates a cross-section view of a handrail 215 or guardrail including a pultruded part 220 with a phosphorescent coating 210. In this example, coating 210 is applied as a strip along an upper surface of pultruded part 220. This allows a user to see the railing in low-light conditions. Detail features 230, 240 may be added to connect the rail to other railing, fencing, or mounting hardware. In one example, pultruded part 220 can include a strip of phosphorescent coating with decorative coatings on the rest of the exposed rail or other combinations of phosphorescent coated surfaces, conventionally coated surfaces and non-coated surfaces including. The pultruded part with phosphorescent coated surfaces could also constitute other railing profiles, fencing, or mounting hardware.

FIG. 3A shows a cross-section of a glow-in-the-dark pultruded base molding 301 in accordance with one embodiment. Base molding 301 includes a pultruded profile 304 having a surface 330 for being fastened to a floor and a surface 320 to be fastened to a wall. At least a portion of an outer, exposed surface 306 includes a phosphorescent coating 310.

FIG. 3B shows a cross-section of a glow-in-the-dark pultruded base molding 302 in accordance with one embodiment. Base molding 302 includes a pultruded profile 305 having a surface 360 for being fastened to a floor and a surface 350 to be fastened to a wall. At least a portion of an outer, exposed surface 307 includes a phosphorescent coating 340.

FIG. 3C shows a cross-section of a glow-in-the-dark pultruded crown molding 303 in accordance with one embodiment. Crown molding 302 includes a pultruded profile 306 having a surface 380 for being fastened to a ceiling and a surface 390 to be fastened to a wall. At least a portion of an outer, exposed surface 369 includes a phosphorescent coating 370.

In the examples of FIGS. 3A, 3B, and 3C, the trim pieces can be modified to include numerous decorative moldings for floors, walls, and ceilings in interior and exterior applications, including door and window trim, that can include pultruded parts with phosphorescent coated surface.

Figure 4:
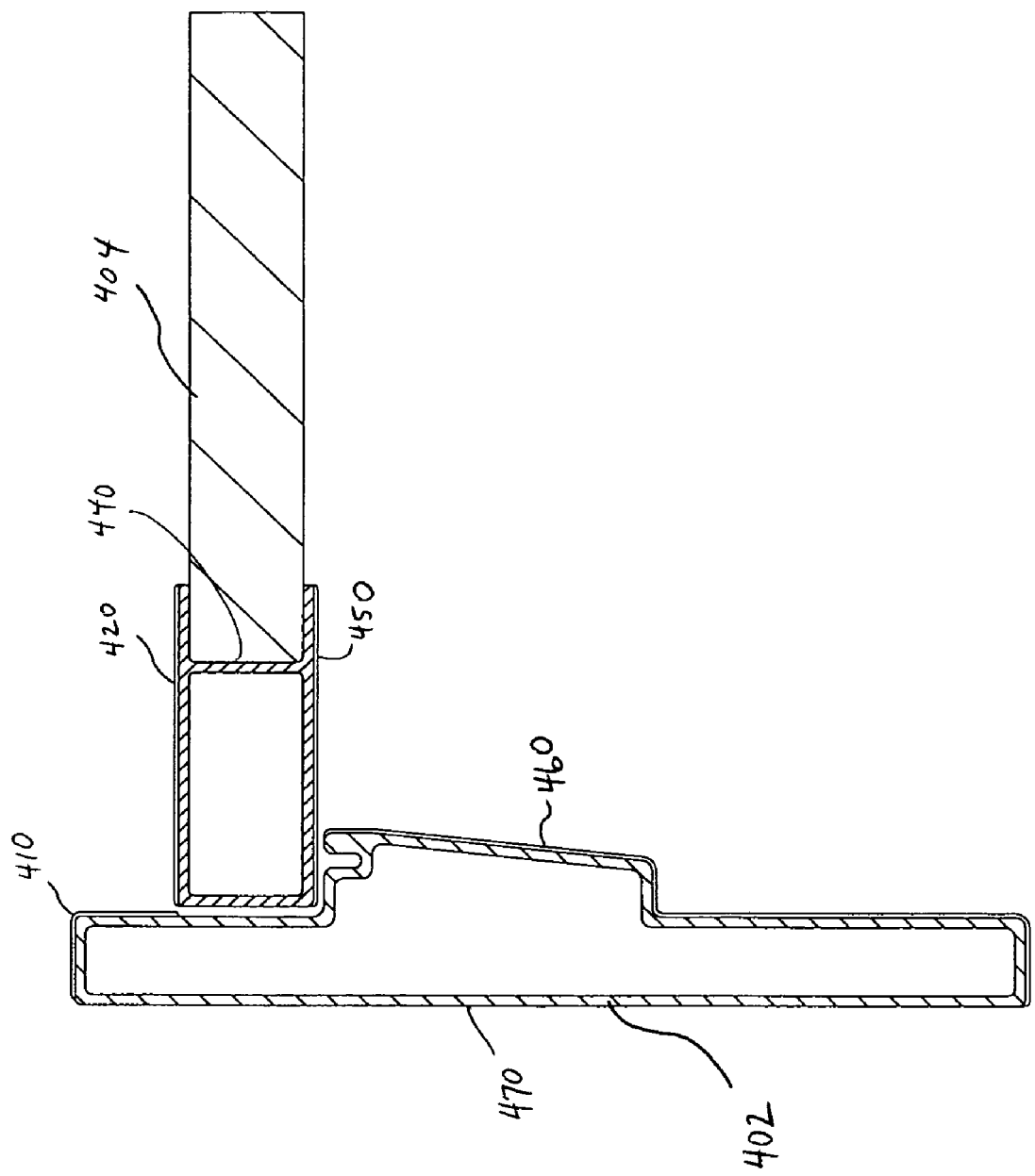
FIG. 4 shows a cross-section of a glow-in-the-dark pultruded door frame in accordance with one embodiment.

FIG. 4 illustrates a door frame 402 and door assembly 404 including pultruded parts with phosphorescent coated surfaces 410, 420, 450, 460. For door frames, the pultruded part could include all or part of the frame assembly. The frame 402 would be fastened to the rough opening at a surface 470. The door 404 could be trimmed with a pultruded part 440 with phosphorescent coated surfaces 420, 450. Other parts of the door assembly including the entire door could include pultruded parts with phosphorescent coated surfaces.

FIG. 5 illustrates a cross-section of a framing piece 520 for ceiling tiles 550, 560 that includes a pultruded part 502 with phosphorescent coated surface 510 on the surface that would be visible in the room. A detail feature 530 could define the tile spacing. Additional features 540 could assist in tile placement and mounting. One skilled in the art could envision numerous shapes that serve to hold and align tile structures.

FIG. 6A shows a perspective view of a glow-in-the-dark pultruded light fixture 602 in accordance with one embodiment. FIG. 6B shows a cross-section of light fixture 602. Light fixture 602 includes a pultruded part 604 with one or more phosphorescent coated surfaces 610, 615, and 630. The phosphorescent coated surfaces 610, 615, and 630 can serve as reflective material while the light is on and serve as light emitting materials with the loss of power to the lights 620. The fixture could also include an assembly with pultruded reflecting surfaces 640, 670. The fixture could also include a pultruded part 650 that also forms the ballast housing or other function purpose such as electrical conduits, mounting, or decorative details.

FIG. 7A illustrates a cross-section of a stair over-molding 740 that includes a pultruded part 742 with phosphorescent coated surfaces 730. The pultruded part 742 could also have additional, non-phosphorescent coated surfaces 750, for example a protective coating.

FIG. 7B illustrates a cross-section of a stair tread 780 that includes a pultruded part 782 with phosphorescent coated surfaces 760. The pultruded part 782 could also have additional, non-phosphorescent coated surfaces 770, for example a protective coating.

It is understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A plastic component, comprising:
    a fiber-reinforced pultruded profile having an outer surface; and
    a phosphorescent coating layered directly onto at least a portion of the outer surface of the pultruded profile, wherein the phosphorescent coating is a film layer that is exposed as an outer surface of the plastic component and there is no material over the phosphorescent coating film layer.

2. The plastic component of claim 1, wherein the phosphorescent coating includes phosphorescent pigments in a thermoplastic resin.

3. The plastic component of claim 1, wherein the phosphorescent coating follows a contour of the outer surface and does not define a separate profile.

4. The plastic component of claim 1, wherein the pultruded profile is formed of a non-phosphorescent, thermoset material, and the phosphorescent coating includes phosphorescent pigments in a thermoplastic resin, and wherein the phosphorescent coating is applied over the pultruded profile such that the outer surface of the pultruded profile is covered by the phosphorescent coating.

5. The plastic component of claim 1, wherein the phosphorescent coating has a thickness of about 15 mils or less.

6. The plastic coating of claim 1, wherein the phosphorescent coating has a thickness of about 10 mils or less.

7. The plastic coating of claim 1, wherein the phosphorescent coating has a thickness of about 5 mils or less.

8. The plastic component of claim 1, wherein the phosphorescent coating covers less then an entire outer surface of the profile.

9. The plastic component of claim 1, wherein the pultruded profile includes a constant cross-section.

10. The plastic component of claim 1, wherein the pultruded profile defines a hand railing.

11. The plastic component of claim 1, wherein the pultruded profile defines a guard railing.

12. The plastic component of claim 1, wherein the pultruded profile defines a fence article.

13. The plastic component of claim 1, wherein the pultruded profile defines a base molding.

14. The plastic component of claim 1, wherein the pultruded profile defines a crown molding.

15. The plastic component of claim 1, wherein the pultruded profile defines a door frame.

16. The plastic component of claim 1, wherein the pultruded profile defines a door panel.

17. The plastic component of claim 1, wherein the pultruded profile defines a ceiling tile frame.

18. The plastic component of claim 1, wherein the pultruded profile defines a light reflector.

19. The plastic component of claim 1, wherein the pultruded profile defines a light fixture.

20. The plastic component of claim 1, wherein the pultruded profile defines stair tread.

21. The plastic component of claim 1, wherein the pultruded profile defines a stair over-molding.

22. A plastic component comprising:
   a fiber-reinforced thermoset pultruded profile having an outer surface; and
   a thermoplastic phosphorescent coating located on at least a portion of the outer surface, wherein the phosphorescent coating is a film layer that is exposed as an outer surface of the plastic component with the phosphorescent coating covering over at least a portion of the outer surface of the pultruded profile and there is no material over the phosphorescent coating film layer.

23. The plastic component of claim 22, wherein the thermoplastic phosphorescent coating includes phosphorescent pigments in a thermoplastic resin.

24. The plastic component of claim 22, wherein the phosphorescent coating follows a contour of the outer surface and does not define a separate profile.

25. The plastic component of claim 22, wherein the pultruded profile is formed of a non-phosphorescent material.

26. The plastic component of claim 22, wherein the phosphorescent coating has a thickness of about 15 mils or less.

27. The plastic component of claim 22, wherein the phosphorescent coating has a thickness of about 10 mils or less.

28. The plastic component of claim 22, wherein the phosphorescent coating has a thickness of about 5 mils or less.

29. A method comprising:
   forming a profile by pulling a fibrous material, having been wetted out by a resin, through a first die;
   curing said resin; and
   applying a thermoplastic, phosphorescent coating to at least a portion of an outer surface of the profile such that the phosphorescent coating is exposed as an outer surface of the plastic component with no material over the phosphorescent coating film layer.

30. The method of claim 29, wherein forming a profile includes forming a profile from a non-phosphorescent thermoset material.

31. The method of claim 29, wherein applying a thermoplastic, phosphorescent coating includes crosshead extruding the coating onto the profile.

32. A method comprising:
   forming a fiber-reinforced thermoset pultruded profile having an outer surface; and
   applying a thermoplastic, phosphorescent coating over at least a portion of the outer surface such that the phosphorescent coating is a film layer defining an outer surface of the plastic component with no material over the phosphorescent coating film layer.

33. The method of claim 32, wherein forming a profile includes forming a profile from a non-phosphorescent thermoset material.

34. The method of claim 32, wherein applying a thermoplastic, phosphorescent coating includes crosshead extruding the coating onto an outer surface of the profile.

35. A plastic component, comprising:
   a fiber-reinforced pultruded profile; and
   a thermoplastic phosphorescent coating forming at least part of an outer surface of the plastic component with no material over the phosphorescent coating film layer.

36. The plastic component of claim 35, wherein the pultruded profile is formed of a non-phosphorescent, thermoset material.

37. The plastic component of claim 35, wherein the phosphorescent coating has a thickness of about 15 mils or less.

38. The plastic component of claim 35, wherein the phosphorescent coating has a thickness of about 10 mils or less.

39. The plastic component of claim 35, wherein the phosphorescent coating has a thickness of about 5 mils or less.

40. A plastic component, comprising:
   a fiber-reinforced pultruded profile formed of a non-phosphorescent, thermoset material and having a profile surface; and
   a phosphorescent coating including phosphorescent pigments in a thermoplastic resin that is layered directly onto at least a portion of the profile surface, wherein the phosphorescent coating is applied over the pultruded profile such that the profile surface of the pultruded profile is covered by the phosphorescent coating such that the phosphorescent coating is a film layer that is exposed as an outer surface of the plastic component, and wherein the phosphorescent coating has a thickness of about 15 mils or less and there is no material over the phosphorescent coating film layer.

41. The plastic component of claim 40, wherein the phosphorescent coating has a thickness of about 10 mils or less.

42. The plastic component of claim 40, wherein the phosphorescent coating has a thickness of about 5 mils or less.

* * * * *